US007122585B2

(12) United States Patent
Nicholl et al.

(10) Patent No.: US 7,122,585 B2
(45) Date of Patent: Oct. 17, 2006

(54) COATING POWDERS, METHODS OF MANUFACTURE THEREOF, AND ARTICLES FORMED THEREFROM

(75) Inventors: Edward G. Nicholl, Reading, PA (US); Joseph J. Kozlowski, Reading, PA (US)

(73) Assignee: Rohm and Haas Company, Philadelphia, PA (US)

(*) Notice: Subject to any disclaimer, the term of this patent is extended or adjusted under 35 U.S.C. 154(b) by 465 days.

(21) Appl. No.: 10/436,539

(22) Filed: May 13, 2003

(65) Prior Publication Data

US 2004/0235984 A1 Nov. 25, 2004

(51) Int. Cl.
*C08K 3/04* (2006.01)
*C08K 9/10* (2006.01)

(52) U.S. Cl. ...................... 523/205; 524/904; 428/511; 523/214; 523/217

(58) Field of Classification Search ................ 523/205, 523/214, 217; 524/439–441, 495–496, 217, 524/904; 428/511
See application file for complete search history.

(56) References Cited

U.S. PATENT DOCUMENTS 3,857,905 A * 12/1974 Blackley et al. ............ 525/166
3,860,557 A 1/1975 Millar et al.
3,943,082 A * 3/1976 Smith et al. ................ 523/427
4,686,108 A 8/1987 Nason et al. ................. 427/27
5,266,652 A * 11/1993 Toyoda et al. ........... 525/327.3
5,585,426 A 12/1996 Williams et al. ............ 524/366
5,698,269 A 12/1997 Carlblom et al. ........... 427/475
5,747,150 A 5/1998 Yamamoto et al. ......... 428/220
5,749,957 A 5/1998 Kieser et al.
5,830,541 A 11/1998 Carswell et al. ............ 427/475
6,479,585 B1 * 11/2002 Hart et al. .................. 525/119
6,863,752 B1 * 3/2005 Han ............................ 156/52
6,875,815 B1 * 4/2005 Mizoguchi et al. ......... 525/193
2004/0063817 A1 * 4/2004 Ilenda et al. ................ 523/220
2004/0185259 A1 * 9/2004 Nicholl et al. .............. 428/413

FOREIGN PATENT DOCUMENTS

EP 0 260 638 B1 2/1994
EP 0 822 236 A1 2/1998
EP 1 176 176 A2 1/2002
GB 13465732 A 2/1974

OTHER PUBLICATIONS

Bouguila N. et al, “Electrostatic Painting Of Insulating Surfaces”, in *IEEE Transactions On Industry Applications* 29 (4): Jul.-Aug. 1993 (Abstract Only).

Singh, S., “Charging Characteristics Of Some Powders Used In Electrostatic Coating”, *IEEE Transactions On Industry Applications* 17(1) :1984 (Abstract Only).

Clements JS, et al, “Electrostatic powder coating of insulating surfaces using an alternating polarity internal corona gun”, *IEEE Transactions On Industry Applications 35* (4): Jul.-Aug. 1999 (Abstract Only).

“Powder Coating And Film Forming Method Using It”, Derwent Publications Ltd., London, GB; Class A85, AN 1999-267355 XP002249719 & JP 11 080612 (Mar. 26, 1999).

“Preparation Processes for Electrically Conductive Film-Forming Powder Coating And Metal Separator For Fuel Cell”Patent Abstracts JP,vol. 2002,No. 06 (Jun. 4, 2002) JP2002060696A.

* cited by examiner

*Primary Examiner*—Peter Szekely
(74) *Attorney, Agent, or Firm*—Andrew E. C. Merriam

(57) ABSTRACT

Coating powders with enhanced electrostatic attraction to low conductivity substrates such as engineered wood are disclosed. The addition of conductive fillers to low temperature cure coating powder compositions improves the coating of difficult to coat substrates such as raised panel cabinet doors. Low temperature cure coating powders containing conductive additives can be applied to preheated engineered wood substrates. Also disclosed are methods for forming a powder coating on a low conductivity substrate.

8 Claims, No Drawings

COATING POWDERS, METHODS OF MANUFACTURE THEREOF, AND ARTICLES FORMED THEREFROM

BACKGROUND

This disclosure relates to coating powder compositions, and more specifically coating powder compositions for deposition on substrates with low electrical conductivity.

Coating powders are dry, finely divided, free-flowing solid materials at room temperature. They are conveniently applied using electrostatic methods. In electrostatic powder coating, an electric potential is generated between the coating powder and the substrate to be coated, causing the powder particles to be attracted to the substrate. Charging of the powder may be effected by an applied voltage or by friction (tribocharging). Electrostatic powder coating has most often been used for metal substrates that are natural conductors of electricity. When substrates are non-conductive or dielectric, the substrates must be treated to make them permanent or temporary electrical conductors.

For materials such as wood, electrically charged primers have been developed. For example, U.S. Pat. No. 4,686,108 to Nason, et al. discloses applying a non-aqueous, surfactant-free primer comprising a conductive polymeric material to a wooden substrate, drying the coating, then applying a coating powder. A drawback of using a primer is that it requires the application of at least two distinct coats.

In U.S. Pat. No. 5,585,426 to Williams, et al. a process for improving the electrostatic charge developed on a coating powder composition for electrostatic coating is disclosed. The powder, which contains an essential electrostatic property-modifying agent (a polyalkylene ether, a polyalkylene glycol, a polyethoxylated stearyl alcohol, a quaternary ammonium salt or a halogenated ammonium salt) incorporated into the resin, is charged by electrical induction/conduction, and then sprayed onto a grounded solid substrate. Once sprayed, the charge facilitates the adherence of the coating powder to the substrate and enables thermal fusing of the coating powder to produce a permanent finish. A drawback of this method is that the coating is subjected to inductive or electrically conductive conditions, thus adding an extra step to the process.

U.S. Pat. No. 5,747,150 to Yamamoto et al. discloses metal substrates having multiple coating layers deposited by electrostatic methods, wherein an undercoating layer is formed from a coating powder composition comprising conductive particles such as carbon black, a conductive metal oxide such as zinc oxide or tin oxide, or an organic antistatic agent such as known anionic, cationic, or anionic surface-active agent. Use of the conductive undercoating improves transfer efficiency of a subsequent coating powder forming an upper layer. A disadvantage of this method is the use of multiple coats. Similarly, EP 260 638 to Nimura et al. discloses a coating powder composition comprising a conductivity-increasing additive such a metal complex azo compound, a phthalocyanine compound, an anthraquinone compound azine compound, an alkyl onium salt, or the metal salt of an organic carboxylic acid.

Another problem associated with the electrostatic powder coating of wood substrates is that during heating of the substrate, moisture tends to be dispelled at a greater rate from the sharp edges, corners, and intricately machined surfaces. Non-uniform moisture evaporation from the surface tends to render the electrostatic attraction of the powder to these areas difficult. Oftentimes, the surfaces of these areas are not coated at all. The accordingly remains a need for improved coating powders for low conductivity substrates.

BRIEF SUMMARY

In a first embodiment, there is provided a coating powder composition comprising a film-forming polymeric component and a conductive additive in the form of a particulate film-forming mixture, wherein the conductive additive is selected from the group consisting of carbon fibers, carbon nanofibers, carbon nanotubes, carbon black, conductive metal fillers, fillers coated with conductive materials, and particulate conductive polymers.

In a second aspect, there is provided an article comprising a powder coating formed from the coating powder composition described above.

In a third aspect, there is provided a method of forming a powder coating comprising applying to a substrate a coating powder comprising a film-forming polymeric material and a particulate conductive additive, causing the coating powder to coalesce to form a film, and curing the film. In yet another aspect, there is provided an article comprising a cured powder coating comprising a particulate conductive additive.

DETAILED DESCRIPTION OF THE PREFERRED EMBODIMENTS

As used herein, a coating powder means a solid, particulate, film-forming composition, whereas a powder coating means the film formed on a substrate by curing a coating powder. Coating powders usually comprise a solid, thermoplastic or thermosetting film-forming polymer resin. A number of different types of thermoplastic resins for coating powders are known, for example vinyl chloride, polyamides, celluloses, polyolefins, polyethylene, and polyesters. Thermosetting film-forming resins contain reactive functional groups, an optional curing agent (crosslinking agent) having functional groups reactive with the functional groups of the polymer resin, and which may itself be another film-forming polymer, and an optional catalyst. Known thermosetting resins include but are not limited to acid-functional polyester resins, acid-functional acrylic resins, epoxy resins, and hydroxy-functional polyester resins.

Preferred polymer resins are low temperature cure thermosetting resins suitable for use with heat-sensitive substrates such as wood, fiberboard, and some plastics. Low temperature cure compositions generally cure at temperatures less than 325° F. (163° C.), preferably less than 300° F. (149° C.), most preferably less than 275° F. (135° C.). Cure is also generally greater than about 100° F. (39° C.), more preferably greater than 200° F. (93° C.) to provide storage and processing stability.

One example of a suitable coating powder composition capable of cure at low temperatures comprises an acid functional polymer such as a carboxylic acid functional polyester or a carboxylic acid functional acrylic resin, a polyepoxy compound, and an optional catalyst. As described in U.S. Pat. No. 6,294,610 to Daly, et al., the combined functionality comprising the carboxylic acid functionality of the carboxylic acid polymer and the epoxy functionality of the polyepoxy compound is preferably at least five, more preferably at least 7.

Useful carboxylic acid-functional polyester resins are linear or branched, being formed from polyols and polyfunctional carboxylic acids (or monomers having both hydroxyl and carboxylic acid functionality).

Examples of suitable polyols for forming the acid-functional polyester include 1,2-ethanediol, 1,3-propanediol, 1,4-butanediol, 1,6-hexanediol, 1,10-decanediol, 1,12-dodecanediol, 1,4-cyclohexanedimethanol, diethylene glycol, triethylene glycol, neopentyl glycol, trimethylolpropane, hydrogenated bisphenol A (2,2-(dicyclohexanol)propane), 2,2,4-trimethyl-1,3-pentanediol, 2-methyl-1,3-propanediol, 3-hydroxy-2,2-dimethylpropyl 3-hydroxy-2,2-dimethylpropanoate (CA. Reg. No. 115-20-4), 2-methyl-2-hydroxymethyl-1,3-propanediol, 2-ethyl-2-hydroxymethyl-1,3-propanediol and the like, and combinations comprising at least one of the foregoing polyols.

Suitable polycarboxylic acids include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid, naphthalene dicarboxylic acid, and the like, and combinations comprising at least one of the foregoing polycarboxylic acids.

To obtain carboxyl-functional polyesters of desired molecular weight, the monomer mixture used to form the polyester has an appropriate excess of carboxyl functionality to hydroxyl functionality. The polyesters are relatively short, having a weight average molecular weight (Mn) of 2,000 to 7,000 AMU, preferably 2,000 to 5,000 AMU, an acid functionality of 1.5 to 4.0, preferably 2 to 2.5, an acid number of 15 to 200 mg KOH/g, preferably 25 to 90 mg KOH/g, and a glass transition temperature (Tg) of at least 40° C., preferably at least 50° C., more preferably at least 65° C. The polyesters may range from amorphous to crystalline. Suitable carboxylic acid-functional polyesters are commercially available and include, for example, ALFTALAT® AN 783 from Vianova Resins, having an acid number of 34, a Tg of 52° C., and a melt viscosity of 45–55 poise at 200° C.; and RUCOTE® 911 from Ruco Polymers, having an acid number of 35, a Tg greater than 55° C., and a melt viscosity of 15 poise at 200° C.

Useful carboxylic acid-functional acrylic polymers have acid numbers from 15 to 200, the high acid number of the acrylic polymers promoting rapid cross-linking and thereby low temperature curing. The Mn of suitable carboxylic acid-functional acrylic polymers is typically about 1000 to 20,000 AMU, the Tg is 40° C. to 65° C., the softening temperature is 60° C. to 80° C. Mixtures of carboxylic acid functional acrylic polymers may be used.

Carboxylic acid functional acrylic polymers are typically derived by reaction of a mixture of acid functional monomers and non-acid functional monomers. Exemplary acid functional monomers are acrylic acid, methacrylic acid, maleic acid, fumaric acid, and citraconic acid. Mixtures comprising one of the foregoing monomers may be used.

Non-acid functional monomers include esters, diesters, triesters and tetraesters of acrylic acid or methacrylic acid, wherein the alcoholic constituent of the ester group is, for example, methanol, 2-ethyl hexanol, n-butanol, n-hexanol, 2-hydroxy ethanol, octanol, 2-ethoxy ethanol, t-butanol, 1,5-pentanediol, N,N-diethylaminoethanol, ethylene glycol, butylene glycol, 1,3-propanediol, decamethylene glycol, 1,4-cyclohexanediol, triethylene glycol, 2,2-propane diol glycerol, tripropylene glycol, 2,2-di(p-hydroxyphenyl)propane, polyoxyethyl-2-2-di(p-hydroxyphenyl)-propane, polyoxypropyltrimethylol propane, 1,2,4-butanetriol, 2,2,4-trimethyl-1,3-pentanediol dimethacrylate, pentaerythritol, trimethylol propane, and 1,4-benzenediol, and the like; styrene and substituted styrene, such as 2-methyl styrene and vinyl toluene; and vinyl esters, such as vinyl acrylate and vinyl methacrylate.

A polyepoxy compound is also present, such that the stoichiometric ratio of the epoxy functionality of the polyepoxy compound to the carboxylic acid functionality of the carboxylic acid functional resin is preferably from 0.7 to 1.3, more preferably from 0.8 to 1.2. The compounds have epoxy functionalities of at least two, preferably at least 3, up to 16. Suitable polyepoxy compounds include heterocyclic polyepoxides having two or more epoxides, such as triglycidylisocyanurate (TGIC); polyepoxides of aromatic polyols such as the diglycidyl ether of 2,2-bis(4-hydroxylphenyl)propane (bisphenol A), bisphenol F, and tetrabromobisphenol A, and the like; low molecular weight polymers derived from the foregoing aromatic polyols and their diglycidyl ethers; cycloaliphatic polyepoxides, such as 3',4'-epoxycyclohexylmethyl 3,4-epoxycyclohexylcarboxylate, dicyclopentadiene dioxide, and the like; glycidyl esters of aromatic or aliphatic polyacids, such as the diglycidyl ester of hexahydrophthalic acid; low equivalent weight epoxy-functional acrylic resins; polyepoxides of aliphatic polyols such as the diglycidyl ether of 1,4-butanediol; and polyepoxides of amino-alcohols, such as the tri-glycidyl ether-amine of 4-amino phenol.

Preferred polyepoxy compounds for low temperature cure compositions include glycidyl esters of aromatic and aliphatic polyacids, for example glycidyl esters of polyacids such as terephthalic, isophthalic, phthalic, methylterephthalic, trimellitic, pyromellitic, adipic, sebacic, succinic, malic, fumaric, tetrahydrophthalic, methyltetrahydrophthalic, hexahydrophthalic, and methylhexahydrophthalic acid. These acids may be copolymerized with other alpha, beta-ethylenically unsaturated monomers, for example esters of acrylic acid or methacrylic acid, such as methyl, ethyl, hexyl, 2-ethoxy ethyl, t-butyl, 2-hydroxyethyl, and 2,2-di(p-hydroxy)phenyl esters, and the like; styrene; substituted styrene such as alpha-methyl styrene; and vinyl esters, such as vinyl acrylate and vinyl methacrylate.

Other preferred polyepoxy compounds, especially for low temperature cure compositions, are epoxy-functional acrylic or methacrylic resins such as glycidyl acrylate or glycidyl methacrylate copolymer (collectively, "GMA") resins. GMA resins are typically obtained from 5 to 30 wt % of glycidyl acrylate or glycidyl methacrylate and 80 to 95 wt % of methyl methacrylate, wherein up to about 50 wt % of the methyl methacrylate can be replaced by another alpha, beta-unsaturated monomer, e.g., styrene, acrylonitrile, and the like. Suitable GMA resins have epoxy equivalent weights of about 200 to about 1000, preferably about 200 to about 600, and an Mn of 200 to about 2000 atomic mass units (AMU) as determined by gel permeation chromatography. They are solid at room temperature, having melting points above about 40° C., preferably a softening point of about 50 to about 75° C., and a Tg of about 40 to about 60° C.

Although the resins are self-curing, the addition of a catalyst to accelerate cure may be useful to raise the curing rate to a commercially desirable value. When present, the curing agent may be used in an amount of 0.1 to 30 parts by weight per 100 parts by weight of the combined acid functional polymer and polyepoxy compound. Catalysts are known, and include, for example, phosphonium compounds such as ethyl triphenyl phosphonium bromide. A particularly suitable catalyst is a tetrasubstituted organoborate salt having the formulae

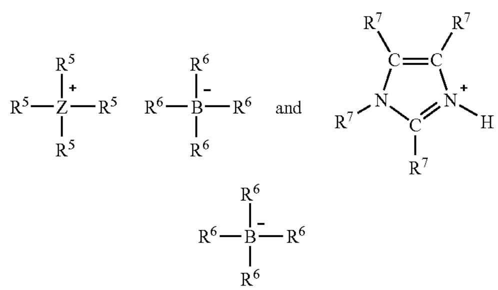

wherein Z is P, As, or N; each $R^5$ is independently $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, or the like; each $R^6$ is independently $C_1$–$C_{12}$ alkyl, $C_6$–$C_{18}$ aryl, $C_7$–$C_{18}$ arylalkyl, $C_7$–$C_{18}$ alkylaryl, Br, Cl, I, F, or the like; and each $R^7$ is independently hydrogen, $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, $C_2$–$C_{12}$ acyl, aldehyde, carboxylate, cyano, nitro, or the like. Specific examples of these compounds and methods for their preparation are provided in U.S. Pat. No. 3,859,379 to Kitamura et al.

Another example of a suitable coating powder composition capable of cure at low temperatures comprises an epoxy thermosetting resin, hereinafter referred to as an epoxy resin, and an optional catalyst. The Tg of the epoxy resin is preferably high enough that the particles do not fuse together or sinter at temperatures likely to be encountered during transportation and storage. Preferably, the Tg is at least 50° C., more preferably at least 60° C.

Suitable epoxy resins include those containing aliphatic or aromatic backbones with oxirane functionality. They may be formed by the reaction of a diol and a halohydrin. Examples include the diglycidyl ether condensation polymers resulting from the reaction of epichlorohydrin with a bisphenol in the presence of an alkaline catalyst. 2,2-Bis(4-hydroxyphenyl) propane (Bisphenol A) is most commonly used but the bisphenols B, F, G, AF, S and H are also suitable. Generally, the bisphenol A type epoxies may be of the type 1 to type 9 form, with the low viscosity type 3 or less epoxy resins being preferred. By controlling the operating conditions and varying the ratio of the reactants, products of various equivalent weights can be made. The epoxy equivalent weight may be 400 to 2,250 AMU, preferably at least at least 550, more preferably at least 750 AMU, and preferably up to 1,100 AMU.

Epoxy resins are available from a wide variety of commercial sources. Useful epoxy resins include the bisphenol A epoxy resins available from Vantico as ARALDITE® GT-7004, GT-7013 (type 3), GT-7014, GT-7072 (type 2), GT-7074, GT-7097, and the like. Bisphenol A epoxy resins further include those available from Shell Chemical Company as EPON® 1007F, EPON® 1009F, EPON® 1004, and the like. Suitable epoxy resins further include the epoxy phenol novolac resins available from Vantico as ARALDITE® GT-7220, and the epoxy cresol novolac resins available from Vantico as ARALDITE® GT-6259.

Catalysts are also useful to accelerate the cure of the above-described epoxy resin, and include, for example, imidazoles, tetrasubstituted organoborate salts as described above, polyamines, and phenolics.

Suitable imidazoles have the formula

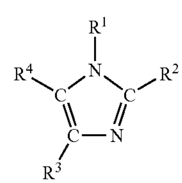

wherein $R^1$-$R^4$ are each independently hydrogen, $C_1$–$C_{12}$ alkyl, $C_6$–$C_{18}$ aryl, $C_7$–$C_{18}$ arylalkyl, $C_7$–$C_{18}$ alkylaryl, or the like. Examples of suitable imidazoles include imidazole, 2-methyl imidazole, and 2-phenyl imidazole (which is commercially available from SKW Chemical Co.). Suitable adducts of such imidazoles with a bisphenol A epoxy resin are available commercially as, for example, EPON® P-101 from Resolution, and ARALDITE® HT-3261 from Vantico. Mixtures of imidazole adducts may be used.

Exemplary polyamines are ethylene diamine, isophorone diamine, cyclohexylenediamine, and a fluorinated diamines such as 4,4'-hexafluoroisopropylidene bis-aniline. In a preferred embodiment, they may be converted from their usual liquid state into a friable solid that may be pulverized. A friable, solid, low-temperature curing agent may be selected from a blocked polyamine such as an adduct of an epoxy resin having an equivalent weight of from 400 to 800 AMU and an aliphatic polyamine having a primary, secondary, and/or tertiary amino group. The epoxy resin portion of the adduct may be aromatic or aliphatic, as exemplified by the bisphenol-based resins mentioned above and the aliphatic analogs thereof, respectively. The cyclohexanol analog of the bisphenol A-based resin is available under the tradename KUKDO 4100. Higher molecular weight polyamines are preferred when epoxy resins having a low equivalent weight are employed. Suitable curing agents derived from polyamines having a primary amino group are available under the trade name HT 835 from Ciba-Geigy and ANCAMINE® 2337 XS from Air Products. An epoxy adduct of an aliphatic polyamine having a secondary amino group, such as ANCAMINE® 2014 AS from Air Products, may be preferred for white and light colored coatings.

Suitable phenolic curing agents having at least two terminal hydroxyl groups, and are exemplified by, but are not limited to bisphenol A endcapped diglycidyl ether of bisphenol A, which is the reaction product of diglycidyl ether of bisphenol A and bisphenol A. Examples of preferred phenolic curing agents for the epoxy resin components include those sold by the Dow Chemical Company under the trade names D.E.H.® 87, D.E.H.® 85, and D.E.H.® 84, all of which are believed to be bisphenol A endcapped diglycidyl ethers of bisphenol A. Other phenolic curing agents include phenol- and cresol-novolac curing agents sold by Georgia Pacific, Reichhold Chemicals, and Ciba-Geigy. The curing agent has a hydroxy equivalent weight (HEW) of 180 to 1000 AMU. Within this range, an HEW of at least 200 AMU may be preferred. Also within this range, an HEW of up to 450 AMU may be preferred.

Other curing agents that can be used to enhance the curing properties include dicyandiamide or o-tolyl biguanide. A suitable dicyandiamide curing agent is sold under the tradename DYHARD® 100M by SKW Chemicals. A suitable o-tolyl biguanide curing agent is sold under the tradename CASAMINE® OTB by Swan Chemical.

Mixtures of curing agents may be used. For example a phenolic curing agent may be used in combination with an imidazole such as 2-methylimidazole or 2-phenylimidazole pre-dispersed at 0.05 to 5 weight percent, based on the total curing agent.

Another example of a suitable coating powder composition capable of cure at low temperatures comprises a GMA resin, a difunctional carboxylic acid curing agent, a catalyst, and optionally 1 to 10 parts per hundred parts of resin of a matte texturizing agent, for example polytetrafluoroethylene (PTFE), or mixtures of PTFE and low melting waxes such as paraffin.

The GMA resin can be in the form of a copolymer that may be produced by copolymerizing between 20 and 100 weight percent (wt %) glycidyl acrylate or glycidyl methacrylate and between 0 and 80 wt % other non-acid functionalized alpha, beta-ethylenically unsaturated monomers as described above, such as methyl methacrylate, butyl methacrylate and styrene. Such a resin can have an Mn of 3,000 to 200,000, preferably of 3,000 to 20,000, as determined by gel permeation chromatography. The GMA resin can be prepared under reaction conditions known in the art, as described, for example, in U.S. Pat. No. 5,407,706. The viscosity of the GMA resin is preferably 10 to 500 poise, and most preferably from 30 to 3000 poise at 150° C., as determined by an ICI Cone and Plate Viscometer. Such resins are commercially available under the trademark ALMATEX from the Anderson Development Company of Adrian, Mich. The GMA resin is present in the powder coating composition in an amount ranging from 20 to 100 phr.

The curing agent for the GMA coating powder composition can be a multifunctional carboxylic acid monomer or polymer, for example a carboxylic acid functional polyester. Preferred curing agents include sebacic acid and polyanhydrides, both well known cross-linking agents that are commercially available. If sebacic acid is used in the formulation, it is present in an amount up to 22 parts per hundred (phr) of GMA resin, preferably 14 to 22 phr. If a polyanhydride is employed, such as 1,12-dodecanedioic polyanhydride (e.g., VXL 1381, from Vianova), it may be present in an amount of up to 35 phr, preferably 23–29 phr. If desired, both cross-linking agents may be used together.

The catalyst is an isopropyl imidazole Bisphenol-A epoxy resin adduct, which is commercially available from Ciba-Geigy Corp. as HT-3261. The catalyst may be added to the formulation in an amount of 1 to 10 phr, preferably 2 to 5 phr.

Still another example of a suitable coating powder composition capable of cure at low temperatures comprises a hydroxy-functional polyester resin used with a blocked isocyanate-functional curing agent. The blocked isocyanate may be internally blocked, such as the uret dione type, or may be of the caprolactam-blocked type, for example isophorone diisocyanate. Hydroxy-functional polyester resins may also be used with an amine-formaldehyde condensate such as, for example, a melamine resin, a urea-formaldehyde resin, a glycol ural formaldehyde resin, or hexahydromethyl melamine.

Mixtures of particulate film-forming polymeric resins may also be used. For example, a carboxy-functional polyester may be used with a carboxy-functional acrylic resin and a curing agent such as bis(beta-hydroxyalkylamide), which serves to cure both polymers. Alternatively, a carboxy-, hydroxy-, or epoxy-functionalized acrylic resin may be used with an epoxy resin or carboxy- or hydroxy-functional polyester resin, selected so as to be co-curing, cured with a single curing agent, or cured with more than one curing agent.

Irrespective of their particular compositions, the coating powder compositions further comprise a conductive additive to improve coverage of the substrate, particularly less conductive or dielectric substrates. Several different types of conductive additives may be used, including conductive carbon, particles coated with a conductive layer, conductive metallic fillers, and conductive quaternary amine divinylbenzene/styrene copolymers.

Conductive carbon includes, for example, carbon fibers, carbon nanofibers, carbon nanotubes, carbon black, or combinations comprising at least one of the foregoing. Various types of conductive carbon fibers are known in the art, and may be classified according to their diameter, morphology, and degree of graphitization (morphology and degree of graphitization being interrelated). These characteristics are presently determined by the method used to synthesize the carbon fiber. For example, carbon fibers having diameters down to 5 micrometers, and grapheme ribbons parallel to the fiber axis (in radial, planar, or circumferential arrangements) are produced commercially by pyrolysis of organic precursors in fibrous form, including phenolics, polyacrylonitrile (PAN), or pitch. These types of fibers have a relatively lower degree of graphitization.

Carbon nanofibers are graphitic or partially graphitic carbon fibers generally having diameters of 3.5 to 500 nanometers (nm), with diameters of 3.5 to 70 nm preferred, and diameters of 3.5 to 50 nm more preferred. The fibers are generally produced from a carbonaceous vapor phase in the presence of a metallic catalyst such as nickel, and may or may not be coated with a pyrolitic layer of carbon. Exemplary carbon nanofibers are available from Asbury Graphite Mills, Inc.

Carbon nanotubes, in contrast, are presently produced by laser-evaporation of graphite or carbon arc synthesis, yielding fullerene-related structures that consist of graphene cylinders, which may be open, or closed at either end with caps containing pentagonal and/or hexagonal rings. Nanotubes may consist of a single wall or have multiple concentrically-arranged walls, and have diameters of 0.7 to 2.4 nm for the single-wall nanotubes and of 2 to 50 nanometers for the multi-wall nanotubes. In the multi-layer structure, the cross-section of the hollow core becomes increasingly small with increasing numbers of layers. At diameters larger than 10 to 20 nm, multi-wall nanotubes begin to exhibit a hexagonal pillar shape, such that the curvature of the nanotubes becomes concentrated at the corners of the pillars. Representative carbon nanotubes are described in U.S. Pat. No. 6,183,714 to Smalley et al; U.S. Pat. No. 5,591,312 to Smalley; U.S. Pat. No. 5,641,455 to Ebbesen et al; U.S. Pat. No. 5,830,326 to Iijima et al; U.S. Pat. No. 5,591,832 to Tanaka et al; and U.S. Pat. No. 5,919,429 to Tanaka et al.

Carbon blacks include particulate carbons sold under a variety of trade names, including but not limited to S.C.F. (Super Conductive Furnace), E.C.F. (Electric Conductive Furnace), Ketjen Black EC (available from Akzo Co., Ltd.) or acetylene black. Preferred carbon blacks are those having average particle sizes less than 200 nm, preferably less than 100 nm, more preferably less than 50 nm. Preferred conductive carbon blacks may also have surface areas greater than 200 square meter per gram ($m^2/g$), preferably greater than 400 $m^2/g$, yet more preferably greater than 1000 $m^2/g$.

In addition to conductive carbon, particles coated with a conductive layer can be used. The particles themselves may be conductive, e.g., copper powders or flakes coated with silver, or nonconductive, e.g., hollow or solid glass spheres coated with silver, glass fibers coated with silver, or aluminum spheres coated with silver. One preferred type of coated particle is copper coated with silver, such as that available from Potters Industries Inc. under the trade name Conduct-O-Fil SC230F8. Silver coated-glass fiber, such as that available from Potter Industries, Inc. under the trade name Conduct-O-Fil S3000-53M silvered spheres is also suitable.

Conductive metallic and non-metallic fillers may also be used, including conductive metals or alloys that do not melt under conditions used to incorporate them into the coating powder. Metals such as aluminum, copper, magnesium, chromium, tin, nickel, silver, iron, titanium, and mixtures comprising any one of the foregoing metals can be incorporated into the resins as solid metal particles. Physical mixtures and true alloys such as stainless steels, bronzes, and the like, can also serve as metallic constituents of the conductive filler particles. In addition, certain intermetallic chemical compounds such as borides, carbides, and the like, of these metals, (e.g., titanium diboride) can also serve as conductive constituents of the conductive filler particles herein. Solid non-metallic, conductive filler particles such as tin oxide, indium tin oxide, and the like may also be used. One suitable filler of this type is conductive titanium dioxide coated with tin oxide and antimony pentoxide (available from ISK, Ltd.).

The conductive filler can also be a conductive polymer, for example, a quaternary amine divinylbenzene/styrene copolymer commercially available from Rohm and Haas. Other type of conductive polymer is a polypyrrole.

The conductive filler may exist in the form of drawn wires, tubes, nanotubes, flakes, laminates, platelets, ellipsoids, spheres, discs, irregular, and other commercially available geometries. The size and amount of the conductive filler present in the coating powder composition will depend on considerations such as the composition of the conductive filler, the cost of the conductive filler, the coating powder composition, filler amount, ease of incorporation into the coating powder composition, conductivity of the substrate, and the like. In general, use of small particles (e.g., particles wherein the maximum dimension of the particle is less than about 150 microns, preferably less than about 50 microns, and more preferably less than about 20 microns, leads to coating powder compositions that form even, conformal powder coatings. Typically, the conductive filler comprises 0.1 to 20 wt %, and most preferably 0.4 to 15 wt. % of the resin portion of coating powder composition (resin and any crosslinking agent). Such amounts result in enhanced conductivity, but do not significantly interfere with coating properties such as melt temperature, durability, hardness, appearance, and the like.

Regardless of the exact size, shape, and composition of the conductive filler particles, they are preferably thoroughly dispersed throughout the coating powder composition. The particles, especially nanoscale particles, may advantageously be pre-dispersed in a resin in order to facilitate incorporation into the coating powder composition.

Use of the described conductive fillers in coating powder compositions imparts enhanced conductivity to the composition, thereby leading to improved deposition by electrostatic or other methods. A particular advantage is that such compositions can be applied to nonconductive substrates that are unprimed, or otherwise uncoated, and achieve improved deposition, for example, more even deposition and/or coverage in corners or other small spaces, particularly sharp outside corners and deep routed areas. Improved deposition leads to improved coatings, particularly for of difficult to coat substrates such as medium density fiberboard door panels.

The coating powder composition may further optionally comprise one or more additives known in the art. Such additives include, for example, flow control agents, dry flow agents, antioxidants, pigments, optical brighteners, extenders, combinations comprising at least one of the foregoing additives, and the like.

Flow control agents, sometimes called leveling agents, are useful to promote the formation of a continuous coating. Suitable flow control agents include polyacrylic esters, non-ionic fluorinated alkyl ester surfactants, non-ionic alkylarylpolyether alcohols, silicones, and the like, and combinations comprising at least one of the foregoing flow control agents. Flow control agents are generally liquids that have been converted to powder form by absorption onto silica-type materials. A preferred flow control agent is a 2-propenoic acid, ethyl ester polymer acrylic resin, available under the tradename RESIFLOW® P-67 by Estron Chemical, Inc.; a 2-hydroxy-1,2-diphenylethanone crystalline solid that is believed to keep the molten coating open for a suitable time to allow outgassing to occur prior to the formation of the hard set film, sold under the tradename Benzoin by DSM, Inc. When present, the flow control agent may be used at an amount of 1 part by weight to five parts by weight, per 100 parts by weight of resin and curing agent when present.

Suitable dry flow agents include fumed silica (for example that sold under the tradename CAB-O-SIL® by Cabot Corporation) and fumed alumina, for example that sold under the tradename Aluminum Oxide C by Degussa Corporation). When present, the dry flow agent may be used in an amount of 0.05 weight percent to 0.5 weight percent, based on the total weight of the composition.

Pigments may be used to adjust color and opacity. Suitable pigments include, for example, titanium dioxide, carbon black, phthalocyanine blue, phthalocyanine green, quinacridone red, perylene red, isoindolone yellow, dioxazine violet, scarlet 3B lake, red 188 azo red, azo pigment yellow 83, iron oxide pigments, and the like. When present, the pigment may be used in an amount of up to 100 parts by weight per 100 parts by weight resin.

Suitable extenders/fillers include calcium carbonate, barium sulfate, dolomite, wollastonite, talc, mica, and the like. When present, the extender may be used in an amount up to 120 parts by weight per 100 parts by weight resin. Within this range, an extender amount of at least 10 parts by weight is preferred. Also within this range, an extender amount of up to 80 parts by weight is preferred.

There is no particular limitation on the method used for forming the curable coating powder. Preferred methods include melt mixing, in which the dry ingredients are weighed into a batch mixer and are mixed with a medium intensity horizontal plow mixer or a lesser intensity tumble mixer. Mixing times may be from 1 to 3 minutes for the high intensity mixers to 30–60 minutes for the tumble mixers. The premix may then be further mixed and compounded as the resin is melted in either a single screw or a twin-screw extruder for 0.5 to 1 minute. The extrudate may be cooled quickly and broken into small chips suitable for grinding. The chips are ground to an appropriate particle size, generally to 120 micrometers, more typically 20 to 80 micrometers.

The curable coating powder may be used in coating glass, ceramics, and graphite-filled composites, as well as metallic substrates such as steel and aluminum. The composition is particularly useful in the coating of heat sensitive substrates such as plastics, paper, cardboard, and woods. Wood is herein defined as any lignocellulosic material, whether it comes from trees or other plants, and whether it be in its natural forms, shaped in a saw mill, separated into sheets and made into plywood, or chipped and made into particleboard, or whether its fibers have been separated, felted, or compressed. It is exemplified by lumber, panels, molding, siding, oriented strand board, hardboard, medium density fiberboard (MDF), and the like. Fiberboard having a pattern such as a simulated wood grain printed on its surface, rather than on a paper laminated to that surface, and a coating powder of this invention over said pattern has the appearance of natural wood. MDF is a particularly valuable coating substrate. A preferred substrate is engineered wood. Substrates may preferably have a moisture content of 3 to 10% by weight. The substrate may be treated to enhance its electrical conductivity. Thus, a porous substrate such as particleboard, pre-coated with a conductive liquid coating composition and cured, may also serve as a substrate for the coating powder. Although not necessary, the wood substrate may be heated to temperatures from 65° C. to 150° C. to drive excess moisture out so it does not cause surface defects in the coating. The curable coating powder is also useful for coating plastic parts for the interior and exterior of automobiles.

The coating powder may be applied to substrates by conventional means, including electrostatic fluidized beds, electrostatic spray guns, triboelectric guns, and the like, in which the powder coating particles are electrostatically charged and the substrate is grounded or oppositely charged. In a particularly advantageous feature, application is directly to a surface of the substate, and does not require use of primers or other undercoats. The substrate is heated (and may optionally be preheated prior to application), to aid the melt, flow, and coalescence of the particles. Coating powders are generally applied to achieve a coating thickness of 1.0 mil (0.0245 millimeters, "mm") to 25 mils (0.102 mm), preferably least 4 to 10 mils (0.1 to 0.25 mm).

After application to the substrate, the applied powder coating is cured, generally at a temperature of 200 to 500° F. (93 to 260° C.), preferably 220 to 450° F. (104 to 232° C.), more preferably 250 to 400° F. (121 to 204° C.). Where low curing temperatures are desired, for example with wood substrates, cure is generally less than 325° F. (163° C.), more preferably less than 300° F. (149° C.), even more preferably less than 250° F. (121° C.). Another advantage of the curable compositions is their ability to produce matte and low gloss finishes over a wide range of curing temperatures. For example, such finishes may be produced over the entire temperature range of 300° to 400° F., more preferably 250° F. to 400° F.

The coating powder disclosed herein provides an improved composition for application to low conductivity substrates such as engineered wood. The addition of conductive filler to the coating powder eliminates the need for application of a primer coat or charging of the substrate. The coating powders disclosed herein are therefore more cost-effective and less time-consuming to use than other coating powders for low conductivity substrates.

Some embodiments of the invention will now be described in detail in the following Examples.

Coating powders were formulated using the following components:

TABLE 1

| Trade Name | Source | Description |
|---|---|---|
| PD 7690 | Anderson Development Company | Acrylic Resin |
| Sebacic Acid | ICC Chemical Corp. | Stabilizer |
| HT 3261 | Vantico Inc. | Hardener |
| Modaflow 2000 | Solutia Inc. | Flow Modifier |
| EX542 | Troy Chemical Corp. | Degassing Aid |
| TR93 | Tioxide Americas Inc. | White Pigment |
| Uvitex OB | Ciba-Geigy Corp. | Whitening Agent |
| Shep. 1 Black | Sheperd Color Co. | Black Pigment |

TABLE 1-continued

| Trade Name | Source | Description |
|---|---|---|
| RO 3097 | Whittaker, Clark & Daniels | Red Pigment |
| TX 183 | Micro Powders Inc. | Texturing Agent |
| Araldite GT 7072 | Vantico Inc. | Epoxy Resin |
| Nyad 325 | NYCO Minerals, Inc. | Wollastonite |
| Epi-Cure P-101 | Resolution Performance Products | Amine Adduct |
| Powdertex 61 | Shamrock Chemical Corp. | Polyolefin |
| AGM94MF-0150 | Asbury Graphite Mills, Inc. | Carbon Fiber |
| SC230F8 | Potters Industries Inc. | Cu/Ag Fiber |
| FT-3000 | Ishihara Sangyo Kaisha | $TiO_2$ coated with tin oxide and antimony pentaoxide |
| SF82TF8 | Potters Industries Inc. | Ag coated Fiber |
| Duolite AP 143/1083 | Rohm & Haas, Inc. | Co-Polymer |
| Raven 1250 Beads | Columbia Chemicals Corp. | Conductive Carbon |
| Alumina C | Degussa Pigment Corp. | Post Blend Additive |
| Cab O Sil M5 | Cabot Corp. | Post Blend Additive |
| Ceridust 9630 F | Clariant Corp. | Post Blend Additive |

Coating powders were prepared in accordance with Table 2 below by initially blending by hand for one minute all components except the fumed alumina or fumed silica. The blend was then melt mixed in a 30 mm twin screw Baker Perkins extruder having a front zone maintained at 180° F. and an unheated rear zone. The extrudate was then chipped and ground with 0.1–0.2% by weight of fumed alumina or fumed silica to a fine powder that passed through a 140 mesh screen (U.S. Standard). The powders were applied to MDF boards by electrostatic coating and cured as indicated.

Properties were assessed by several methods. In the Hot Plate Melt Flow (HPMF) test a pellet of powder having a diameter of 12.7 mm and a thickness of 6 mm is placed on a hot plate set at 300° F. (148.9° C.) at an inclination angle of 35 degrees. The pellet melts and runs down the plate. The length of the flow is measured in millimeters. The distance the coating flows is dependent on the initial melt viscosity, the rate of reaction, the temperature at which the test is conducted, and the type and amount of catalyst.

The 60° Gloss is a measurement of the specular gloss for a glossmeter geometry of 60°.

The methyl ethyl ketone (MEK) resistance test is used to determine the degree of cure of the powder coating and chemical resistance of the coating by rubbing a MEK soaked cotton swab back and forth, 50 times (referred to as 50 double rubs) on the coated panel with moderate pressure. It is rated on a scale of 1 to 5, wherein 1 indicates rub through to the substrate, 3 indicates no rub through but coating on the swab, 4 indicates a very slight amount on the swab, slight dulling on the coating, and 5 no effect at all to the coating.

In the Table below, BST is the board surface temperature at the time the powder is applied to the substrate. Preheat and Cure Temperatures are the temperatures at which the ovens were set, not the temperatures that the substrate was at during these exposures. All component amounts are expressed as parts per hundred parts by weight resin, except where it is indicated as weight percent, which is calculated on the basis of the total composition. All cured coatings gave a textured appearance.

TABLE 2

| | Sample No. | | | | | | |
|---|---|---|---|---|---|---|---|
| Component | 1* | 2 | 3 | 4 | 5 | 6 | 7 |
| PD 7690 | 82* | 82 | 82 | 82 | 82 | 82 | — |
| Sebacic Acid | 15 | 15 | 15 | 15 | 15 | 15 | — |
| HT 3261 | 2 | 2 | 2 | 2 | 2 | 2 | — |
| Modaflow 2000 | 1.5 | 2 | 2 | 2 | 2 | 2 | 1 |
| EX542 | 1 | 1 | 1 | 1 | 1 | 1 | — |
| TR93 | 40 | 40 | 40 | 40 | 40 | 40 | — |
| Uvitex OB | 0.1 | 0.1 | 0.1 | 0.1 | 0.1 | 0.1 | — |
| Shep. 1 Black | 0.03 | 0.03 | 0.03 | 0.03 | 0.03 | 0.03 | — |
| RO 3097 | 0.002 | 0.002 | 0.002 | 0.002 | 0.002 | 0.002 | — |
| TX 183 | 4.5 | 4.5 | 4.5 | 4.5 | 4.5 | 4.5 | — |
| Araldite GT 7072 | — | — | — | — | — | — | 100 |
| Nyad 325 | — | — | — | — | — | — | 25 |
| Epi-Cure P-101 | — | — | — | — | — | — | 2 |
| Powdertex 61 | — | — | — | — | — | — | 2.1 |
| AGM94MF-0150 | — | 3 | — | — | — | — | — |
| SC230F8 | — | — | 29 | — | — | — | — |
| FT-3000 | — | — | — | 20 | — | — | — |
| SF82TF8 | — | — | — | — | 29 | — | — |
| Duolite AP 143/1083 | — | — | — | — | — | 5 | — |
| Raven 1250 Beads | — | — | — | — | — | — | 2 |
| Additive % | 0.0 | 2.0 | 19.8 | 13.6 | 19.8 | 3.4 | 1.85 |
| Alumina C | 0.20% | 0.2% | 0.20% | 0.20% | 0.20% | 0.20% | — |
| Cab O Sil M5 | — | — | — | — | — | — | 0.2% |
| Ceridust 9630 F | — | — | — | — | — | — | 0.2% |
| Preheat Temp. (° F.) | 375 | 375 | 375 | 375 | 375 | 375 | 375 |
| Preheat Time (min) | 10 | 10 | 10 | 10 | 10 | 10 | 10 |
| BST (° F.) | 200 | 200 | 200 | 200 | 200 | 200 | 200 |
| Cure Temp. (° F.) | 375 | 375 | 375 | 375 | 375 | 375 | 375 |
| Cure Time (min) | 6 | 6 | 6 | 6 | 6 | 6 | 5 |
| Gel Time (sec) | 144 | 152 | 252 | 135 | 130 | 132 | 75 |
| HPMF (mm) | 15 | 16 | 15 | 12 | 12 | 12 | 15 |
| 60° Gloss | 24.4 | 13 | 6.1 | 8.6 | 10.6 | 20.1 | 3 |
| MEK | 5 | 4.5 | 4 | 5 | 5 | 5 | 4 |
| Appearance Color | White | Blue-Grey | Green-Grey | Light Tan | Tan | White | Black |
| Coverage | Bare corners, light in routed areas | Full | Full | Full | Full | Full | Full |

*Control

As may be seen by reference to the above table, compositions 2–7 containing a conductive additive have full coverage of the substrate as compared to the control composition 1 with no conductive additive.

All patents and references cited herein are incorporated by reference. Unless explicitly stated otherwise, the amounts molecular weights, ratios, temperatures, time, and reaction conditions and the like usually can be varied to a degree from about the lower stated number to about the higher stated number of each specific range.

The invention claimed is:

1. A coating powder composition comprising a resin and a conductive additive in the form of a particulate film-forming mixture, wherein the conductive additive is selected from the group consisting of carbon nanofibers, copper powders coated with silver, copper flakes coated with silver, glass fibers coated with silver, titanium dioxide coated with tin oxide and antimony pentaoxide, and quaternary amine divinylbenzene/styrene copolymer.

2. The composition of claim 1 wherein the film forming composition comprises a carboxylic acid functional polymer, a multifunctional epoxy compound, and an optional catalyst.

3. The composition of claim 1 wherein the film-forming composition comprises a glycidyl (meth)acrylate (GMA) resin, a multifunctional carboxylic acid curing agent, an optional catalyst, and an optional matte-texturizing agent.

4. A method of forming a coating comprising applying directly to a surface of a substrate a coating powder comprising a resin and a conductive additive in the form of a particulate film-forming mixture, wherein the conductive additive is selected from the group consisting of carbon fibers, carbon nanofibers, copper powders coated with silver, copper flakes coated with silver, glass fibers coated with silver, titanium dioxide coated with tin oxide and antimony pentoxide, and quaternary amine divinylbenzene/styrene copolymer and mixtures comprising at least one of the foregoing conductive additives;

coalescing the applied coating powder; and optionally curing the applied, coalesced coating powder, wherein, when the said conductive additive is carbon fibers, the said substrate comprises engineered wood or medium density fiberboard (MDF).

5. The method of claim 4 wherein the substrate comprises engineered wood or medium density fiberboard (MDF).

6. The method of claim 5 further comprising heating the substrate prior to applying the coating powder.

7. A coated article formed according to the method as claimed in claim 4.

8. A coated article formed from the composition of claim 1.

* * * * *